Figure 1:
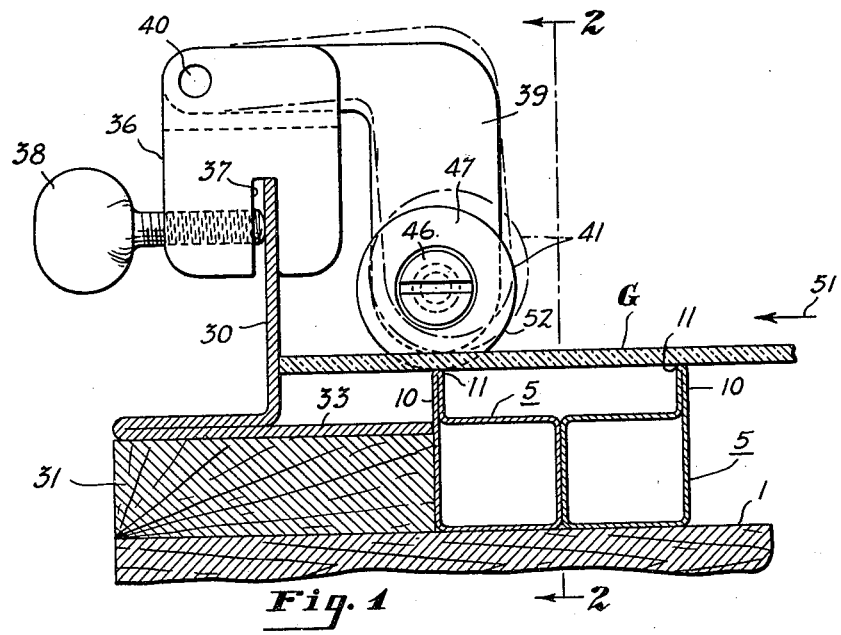

April 29, 1952 — O. M. ITAYA — 2,595,079

GAUGE STOP FOR GLASS TABLES

Filed Nov. 5, 1947

INVENTOR
Oliver M. Itaya
BY Evans & McCoy
ATTORNEYS

Patented Apr. 29, 1952

2,595,079

UNITED STATES PATENT OFFICE 2,595,079

GAUGE STOP FOR GLASS TABLES

Oliver M. Itaya, Cleveland, Ohio, assignor to The F. C. Russell Company, Cleveland, Ohio, a corporation of Ohio Application November 5, 1947, Serial No. 784,191

6 Claims. (Cl. 33—18)

This invention relates to gauge stops, and more particularly to such stops for use on glass processing or cutting tables.

Tables for supporting glass sheets while the latter are scored or cut to size customarily include guide rails or fences against which the edges of glass sheets are abutted and along which the glass is measured. It is also conventional to mark permanent scales on glass cutting or processing tables, particularly along the guide rail or fence, to facilitate measurement of the sheet being processed. When glass sheets are to be cut to uniform size in large quantities a stop or indexing device mounted on the guide rail or fence serves to locate glass sheets on the processing table in predetermined position. The present invention is directed to the general improvement of gauge stops for glass processing tables and the like, it being one of the principal objects of the invention to provide a gauge stop which normally is movable to different positions along a supporting guide rail or fence and which is readily displaced to clear the edge of a glass sheet so that the latter can be shifted along the guide rail without altering or interfering with the setting of the stop on the guide rail.

Another object of the invention is to provide, in combination with a glass processing table, a gauge stop having a glass contacting element that, upon movement thereagainst of the edge of a glass sheet, is movable in a direction transverse to the plane of the glass so as to clear the glass for movement past the gauge stop. More specifically, and as a preferential arrangement, the invention aims to provide a gauge stop of the character mentioned which has a glass contacting element pivotally mounted for displacement out of the path of a supported glass sheet. The glass contacting element is supported for movement either upwardly or downwardly into and out of the path of a glass sheet or plate supported on the processing table, a suitable arrangement being one in which the element is located on the end of a pivoted arm so as to rest by gravity on the glass supporting structure of the table or on the top of a glass sheet or plate interposed between the supporting structure and the glass contacting element of the gauge. The arm is so pivoted and the element is so shaped that when the glass is moved against the element in one direction the element rides over the edge of the glass so as to be supported on the latter, permitting the glass to be moved about over the supporting table without interference or hindrance by the gauge stop. When the edge of the glass sheet or plate is moved against glass contacting element in another direction, the element acts as a stop to limit the glass movement thereby serving to locate the glass in predetermined position on the table.

Other objects and advantages of the invention relate to certain details of construction and arrangements of parts which will become apparent as the following description of a suitable embodiment proceeds. This description is made in connection with the accompanying drawings forming a part of this specification and in which like parts are indicated by the same numerals of reference in both views.

Figure 2:
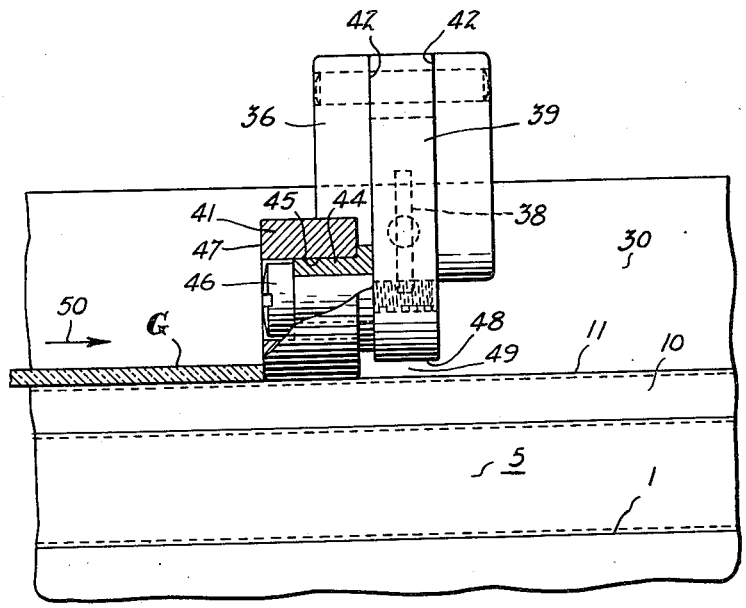

In the drawings:

Figure 1 is a fragmentary sectional view through a portion of the top of a glass processing table, parts being broken away and removed, showing the adjustable gauge stop of the present invention in side elevation; and Fig. 2 is a view, partly in section and with parts broken away, taken substantially on the line indicated at 2—2 of Fig. 1.

The gauge stop is shown mounted on the guide rail of a structure of the type disclosed in copending application for United States patent Serial No. 784,267 filed November 5, 1947, now Patent No. 2,578,919 granted December 18, 1951, and entitled Glass Processing Table. Parts described in the application referred to are identified in the drawings of the present invention by the same numerals of reference.

The work table or bench on which glass sheets are processed or cut has a top 1 of wooden planks or plywood. A number of sheet metal tubes 5 are disposed across the top of the table. The tubular supports are arranged in pairs, one such pair being shown in the drawings, and they each have upstanding flanges 10 formed by reversely bent portions of the metal of the tubes. Reverse bends 11 of the several tube flanges are disposed to lie in substantially a common plane parallel to the table top for supporting contact with the underside of a glass sheet G to be cut or processed. The reversely bent flanges 11 provide smooth straight surfaces for contacting the undersides of the glass sheets and the edges of the upstanding flanges have a wiping action which removes from the glass grit and other foreign particles which might otherwise scratch the glass sheet. The removed grit and particles drop down into the spaces between the flanges.

Along one end of the table, but not illustrated in the drawings, is a bed bar and cutting guide used in cutting or trimming the glass sheets. Along a side edge of the table, at 90° or other suitable angle to the bed bar and glass cutting guide, is a guide fence or rail 30 formed of a strip of sheet metal bent or rolled to approximately T-shape in cross section and supported on a wooden spacer 31. The rail 30 and the spacer 31 are secured to the table top 1 by screws, not shown. The guide rail 30 extends above the level of the glass supporting reverse bends of the flanges 10 and bottom flange 33 of the guide fence abuts and parallels one of the glass supporting tubes 5.

A sheet of glass being processed on the table is brought edgewise into abutment with the guide fence 30 so as to properly orient the glass. To locate the glass for cutting to predetermined length an edge thereof is brought into engagement with a guide stop mounted on the rail 30. The present invention is particularly concerned with the construction and operation of the guide stop. This device comprises a cast metal body member 36 which may also be machined from a solid block. A transverse slot 37 across the bottom of the body receives and has a running fit on the guide rail 30 so that the stop can be moved to different positions along the rail. A thumb screw 38, threaded through the stop body 36, may be made to bear against the rail 30 to clamp the stop in adjusted position. A channel in the top of the body member 36 is disposed transversely to the slot 37 and receives one end of an L-shaped arm 39, walls 42 of the channel having sliding engagement with the arm to guide the latter. The arm is pivoted for up and down movement on a pin 40 secured in the stop body 36 and is engageable with the bottom of the channel to limit downward movement of the arm.

The arm 39 constitutes part of a glass engaging element or assembly which also includes a roller 41 mounted on the bottom end of the depending portion of the arm. A flanged bushing or ferrule 44 is received by a press or shrink fit within a central bore 45 of the roller 41 and is rotatable on a shouldered cap screw 46 threaded into the lower end of the depending portion of the arm. The bushing 44 is of less axial length than the roller bore 45 so that the head of the cap screw is recessed within the bore and end surface 47 of the roller is unobstructed.

As shown in Fig. 2 the roller projects below bottom end 48 of the arm 39 providing a clearance 49 between the arm and the upper edge of the glass supporting flange 10 on which the roller 41 rests by gravity. The width of the base flange 33 of the guide rail 30 is such that the upstanding glass supporting flange 10 of the glass supporting tube abutted against the rail flange is disposed directly under the rotational axis of the roller 41.

In adjusting the guide stop on the rail 30 the body 36 of the stop is slid along the rail to a position in which the distance from the face 47 of the roller to the cutting guide of the glass process table represents the desired dimension at which the glass is to be cut. The thumb screw 38 is then tightened against the rail 30 to lock the gauge stop in position. Thereafter a glass sheet G brought against the rail guide 30 to the left of the gauge stop, as viewed in Fig. 2, and then moved in the direction of arrow 50 into abutment with the face 47 of the roller 41 is located on the processing table in the desired position for cutting or scoring.

When it is desired to cut a glass sheet to a dimension longer than that for which the gauge stop is set, the glass sheet is first moved in the direction of arrow 51 (Fig. 1), the edge of the glass engaging curved periphery 52 of the roller 41 causing the roller to ride up over the edge of the glass sheet approximately to the broken line position shown. When so raised, the roller 41 rests by gravity on the upper surface of the glass sheet G permitting the latter to be moved about on the processing table to any desired position with the edge of the glass sheet in abutment with the guide rail 30. As a glass sheet is withdrawn from under the roller 41, the latter and the arm 39 drop by gravity to the full line position shown in the drawings in which they serve to gauge or measure a glass sheet moved against the roller as in Fig. 2.

Curved periphery 52 of the roller provides an inclined surface which is disposed at an acute angle to the plane of a sheet of glass supported on the reverse bends 11 of the table flanges 10. This inclined surface enables the glass contacting element comprising the arm 39 and the roller 41 to ride over the edge of a sheet of glass moved against the roller in the direction of the arrow 51 (Fig. 1). Although the inclined surface which rides over the edge of the glass sheet is provided by the periphery of a rotatable roller, a similar although less efficient arrangement is provided by a non-rotating glass contacting element having a bottom surface curved or inclined at an acute angle to the plane of the glass. For example, the curved or rounded bottom of the depending portion of the arm 39 may be used without the roller 41.

In the commercial or large scale production of glass lights cut to predetermined dimensions from large sheets or plates, as, for example, in the manufacture of windows and doors, a number of the gauge stops of the present invention are mounted along the guide rail 30 at spaced intervals corresponding to the desired distances from the cutter guide bar. A glass sheet to be cut is then brought into abutment with the guide rail 30, passing under the rollers of one or more of the guide stops and being brought into edgewise abutment of the roller of the particular gauge stop that is to determine the dimension of the cut to be made. Thus a glass processing or cutting table can be equipped to facilitate the cutting of glass lights of various sizes without any necessity for the operator to individually scale the dimension of each cut to be made. The only requirement is that the operator move the glass sheet into edgewise abutment with the side face 47 of the proper gauge stop, the other gauge stops intervening between the measuring gauge stop and the cutter guide bar being elevated or raised out of position as the glass sheet is moved laterally into abutment with the guide rail 30.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. In combination in a glass processing table having a plurality of upstanding substantially parallel thin elements with edges disposed in a common plane for simultaneously engaging and supporting a sheet of glass, a fence supported in parallel relation to the elements, and a gauge stop assembly mounted on the fence for facile removal as a unit, said gauge stop assembly including a body formed with a slot to receive the fence so as to straddle the latter, an arm pivoted on a central portion of the body and having an end disposed in overlying relation to one of the element edges, and a rotatable roller journaled on said arm end for rotation about an axis normally disposed in the vertical plane of one of the upstanding elements, said roller normally resting by gravity on said one element edge to serve as a stop upon movement of a glass sheet against a side face thereof and to ride over a glass sheet upon movement of a glass sheet against the roller periphery, the pivot axis of the arm being spaced horizontally from said plane whereby the rotation axis of the roller is displaced laterally from its normal position when the roller rides over the edge of a supported glass sheet.

2. In combination in a glass processing table having a plurality of upstanding substantially parallel thin elements with edges disposed in a common plane for simultaneously engaging and supporting a sheet of glass, a fence supported in parallel relation to the elements, and a gauge stop assembly mounted on the fence for facile removal as a unit, said gauge stop assembly including a body formed with a slot to receive the fence so as to straddle the latter, an arm having a generally horizontal element pivotally connected to a central portion of the body for swinging movement on a generally horizontal axis above the top of the fence and a generally vertical element disposed in overlying relation to one of the thin element edges, and a rotatable roller on the vertical element of the arm, said roller being journaled on the lower end of the vertical element of the arm for rotation about an axis normally disposed substantially in the vertical plane of one of the upstanding elements, said roller normally resting by gravity on said one element edge to serve as a stop upon movement of a glass sheet against a side face thereof and to ride over a glass sheet upon movement of a glass sheet against the roller periphery, the pivot axis of the arm being spaced horizontally from said plane whereby the rotation axis of the roller is displaced laterally from its normal position when the roller rides over the edge of a supported glass sheet.

3. In combination in a cutting table, means for contacting a sheet to be cut at a plurality of points in a common plane to support such sheet, a fence to engage one edge of a supported sheet to limit the movement of the sheet over the table, said fence being disposed in a plane substantially normal to the common support plane and having an upper edge disposed above said common plane, and a gauge stop assembly mounted on the fence for facile removal as a unit, said gauge stop assembly including a body formed with a slot to receive the fence so as to straddle the latter, an arm pivoted on a central portion of the body to turn about an axis parallel to said plane, above the upper edge of the fence and laterally offset from the plane of the fence in a direction away from a supported sheet, and a rotatable roller on the end of the arm, said roller normally resting by gravity on the sheet contacting means to support the roller and the arm thereon, the roller and arm being displaceable upwardly upon movement of the edge of a supported sheet against the periphery of the roller and the roller acting as a stop upon movement of a supported sheet against a side face thereof.

4. A gauge stop assembly for use in combination with a cutting table having sheet supporting means, said stop assembly comprising a body mountable on the table, an arm pivoted on the body for free swinging movement toward and away from the sheet supporting means, and a roller and means mounting the roller wholly on one side of the arm for turning movement about an axis parallel to the pivot axis of the arm, one side face of the roller being substantially flat and disposed in a plane normal to the turning axis, and the roller mounting means and the arm being wholly disposed on one side of the roller face plane to permit use of the entire area of said roller side face as a uniform stop.

5. In a cutting table having means for supporting a sheet to be cut for movement to different positions thereon, an upright fence carried by the table for engaging one edge of a supported sheet to position such sheet for movement along a predetermined path in the table, a gauge stop movable to different positions along the fence, said stop having a body and means to retain the body in adjusted position on the fence, a part mounted on the body for free up and down pivotal movement about an axis parallel to the plane of the fence and to the plane of a supported sheet, said part including a roller journaled to turn about an axis substantially parallel to the plane of a supported sheet, said roller having one face substantially perpendicular to a table supported sheet and normally disposed to engage another edge of such sheet upon movement of the latter along said path whereby to limit such movement to locate the sheet in predetermined position along said path, and said roller having another face inclined at an acute angle to the plane of a supported sheet and normally disposed to engage said one edge as the latter is moved toward the fence so that said part of the stop is raised by the sheet to ride over the edge thereof, the raised part being arranged to bear against the sheet to be supported by the latter as the sheet is moved to different positions along said path.

6. In a glass cutting table combination, means for supporting a sheet of glass for generally horizontal movement to different positions, a rail, a stop comprising a body member mounted on the rail and movable to different positions therealong, an arm, means mounting the arm on the body member for swinging movement about a generally horizontal axis, a roller journaled on the arm for rotation about a generally horizontal axis below the swing axis of the arm, the roller axis being in fixed relation to the arm, and stop means limiting the downward movement of the arm to locate the roller substantially wholly above the glass supporting means, the roller having a substantially flat side face disposed substantially normal to the plane of a supported glass sheet for engagement by such sheet to limit the movement of the sheet in locating the sheet on the table, and the roller having a substantially circular peripheral face for engagement by the edge of a supported sheet, the roller being normally disposed and supported so that the peripheral face thereof is disposed at an oblique angle to the plane of a supported glass sheet for riding over the edge of such a sheet when the latter is moved against the peripheral roller face in shifting the sheet on the table.

OLIVER M. ITAYA.

REFERENCES CITED

The following references are of record in the file of this patent:

UNITED STATES PATENTS

| Number | Name | Date |
|---|---|---|
| 743,650 | Mancha | Nov. 10, 1903 |
| 1,307,844 | Bennett | June 24, 1919 |
| 1,464,839 | Albo et al. | Aug. 14, 1923 |
| 1,566,225 | Mills | Dec. 15, 1925 |
| 1,589,276 | Weeks | June 15, 1926 |
| 2,158,466 | Little | May 16, 1939 |
| 2,278,273 | Limbers | Mar. 31, 1942 |
| 2,435,382 | Caskey | Feb. 3, 1948 |